US011574213B1

(12) United States Patent
Proctor et al.

(10) Patent No.: US 11,574,213 B1
(45) Date of Patent: Feb. 7, 2023

(54) SYSTEMS AND METHODS FOR INFERRING RELATIONSHIPS BETWEEN ENTITIES

(71) Applicant: Palantir Technologies Inc., Denver, CO (US)

(72) Inventors: Douglas Proctor, New York, NY (US); Andrew Buie, Palo Alto, CA (US); Evan Brown, New York, NY (US); Gabrielle Javitt, New York, NY (US); Hunter Wills, Palo Alto, CA (US); Kendra Knittel, Palo Alto, CA (US); Mitchell Beard, Washington, DC (US); Stephen Yazicioglu, New York, NY (US); Claire Dolin, Washington, DC (US); Lucas Ray, San Francisco, CA (US)

(73) Assignee: Palantir Technologies Inc., Denver, CO (US)

( * ) Notice: Subject to any disclaimer, the term of this patent is extended or adjusted under 35 U.S.C. 154(b) by 451 days.

(21) Appl. No.: 16/776,431

(22) Filed: Jan. 29, 2020

Related U.S. Application Data

(60) Provisional application No. 62/886,824, filed on Aug. 14, 2019.

(51) Int. Cl.
*G06N 5/04* (2006.01)
*G06Q 50/00* (2012.01)
*G06N 5/02* (2006.01)

(52) U.S. Cl.
CPC ............... *G06N 5/04* (2013.01); *G06N 5/02* (2013.01); *G06N 5/022* (2013.01); *G06N 5/045* (2013.01); *G06Q 50/01* (2013.01)

(58) Field of Classification Search
None
See application file for complete search history.

(56) References Cited

U.S. PATENT DOCUMENTS

| 2010/0131502 | A1* | 5/2010 | Fordham | H04L 51/04 707/E17.014 |
| 2012/0047102 | A1* | 2/2012 | Petersen | G06N 5/04 706/52 |
| 2012/0063427 | A1* | 3/2012 | Kandekar | G06Q 30/0269 370/338 |
| 2014/0035957 | A1* | 2/2014 | Ingulsrud | G01C 21/32 345/672 |
| 2014/0122040 | A1* | 5/2014 | Marti | G06F 30/20 703/6 |
| 2017/0206223 | A1* | 7/2017 | Bell | G06N 5/022 |
| 2019/0197640 | A1* | 6/2019 | Akselrod | G06F 7/02 |
| 2021/0027194 | A1* | 1/2021 | Monaghan | G06N 5/02 |

* cited by examiner

*Primary Examiner* — Irene Baker
(74) *Attorney, Agent, or Firm* — Sheppard Mullin Richter & Hampton LLP

(57) ABSTRACT

Systems and methods are provided for obtaining sensor data comprising one or more entities and one or more attributes of the respective one or more entities. The systems and methods may be configured to infer one or more relationships between the respective one or more entities based on the one or more attributes, and update the sensor data based on the inferred one or more relationships.

19 Claims, 9 Drawing Sheets

SYSTEMS AND METHODS FOR INFERRING RELATIONSHIPS BETWEEN ENTITIES

TECHNICAL FIELD

This disclosure relates to approaches for inferring one or more relationships between entities. More specifically, this disclosure relates to processing sensor data, which includes various datasets, to infer one or more relationships between the entities of the sensor data.

BACKGROUND

Under conventional approaches, machines may track large amounts of data without fully understanding a meaning, significance, or purpose of the data. In some instances, such conventional approaches may not adequately capture or infer relationships between entities of the data, and/or may not predict changes in the data. Thus, for example, conventional approaches may not be useful for coordinating or strategizing an action based on the data.

SUMMARY

Various embodiments of the present disclosure can include systems, methods, and non-transitory computer readable media configured to obtain sensor data comprising one or more entities and one or more attributes of the respective one or more entities; infer one or more relationships between the respective one or more entities based on the one or more attributes; and update the sensor data based on the inferred one or more relationships.

In some embodiments, the one or more attributes comprise a location or a time of the respective one or more entities.

In some embodiments, the inferring the one or more relationships comprises inferring one or both of a hierarchical relationship and a geospatial relationship between the one or more entities.

In some embodiments, the inferring the one or more relationships comprises inferring one or more identities of the respective one or more entities, and wherein, the systems, methods, and non-transitory computer readable media are further configured validate the one or more inferred identities based on a characteristic of a location of the respective one or more entities.

In some embodiments, the validating the one or more inferred identities further comprises determining whether the one or more entities is compatible with the characteristic of the location; and the systems, methods, and non-transitory computer readable media are further configured to, in response to determining that the one or more entities is not compatible with the characteristic of the location, modify the one or more inferred identities to be compatible with the characteristic of the location or move the one or more entities to a nearest location having a compatible characteristic.

In some embodiments, the characteristic comprises at least one of a slope, a state of matter, and a concentration of moisture of the location.

In some embodiments, the inferring the one or more relationships comprises inferring the hierarchical relationship and the geospatial relationship between the one or more entities; and the hierarchical relationship comprises one of an adversarial relationship between the one or more entities, a cooperative relationship between the one or more entities, an associative relationship between the one or more entities, an ownership relationship of the one or more entities, and an associative relationship of the one or more entities.

In some embodiments, the systems, methods, and non-transitory computer readable media are further configured to infer a location of another entity based on the inferred one or more relationships.

In some embodiments, the systems, methods, and non-transitory computer readable media are further configured to detect a movement of the one or more entities; and infer the one or more relationships based on the detected movement of the one or more entities.

In some embodiments, the systems, methods, and non-transitory computer readable media are further configured to predict a movement of the one or more entities based on the one or more attributes.

These and other features of the systems, methods, and non-transitory computer readable media are disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention(s).

DETAILED DESCRIPTION

Figure 1:
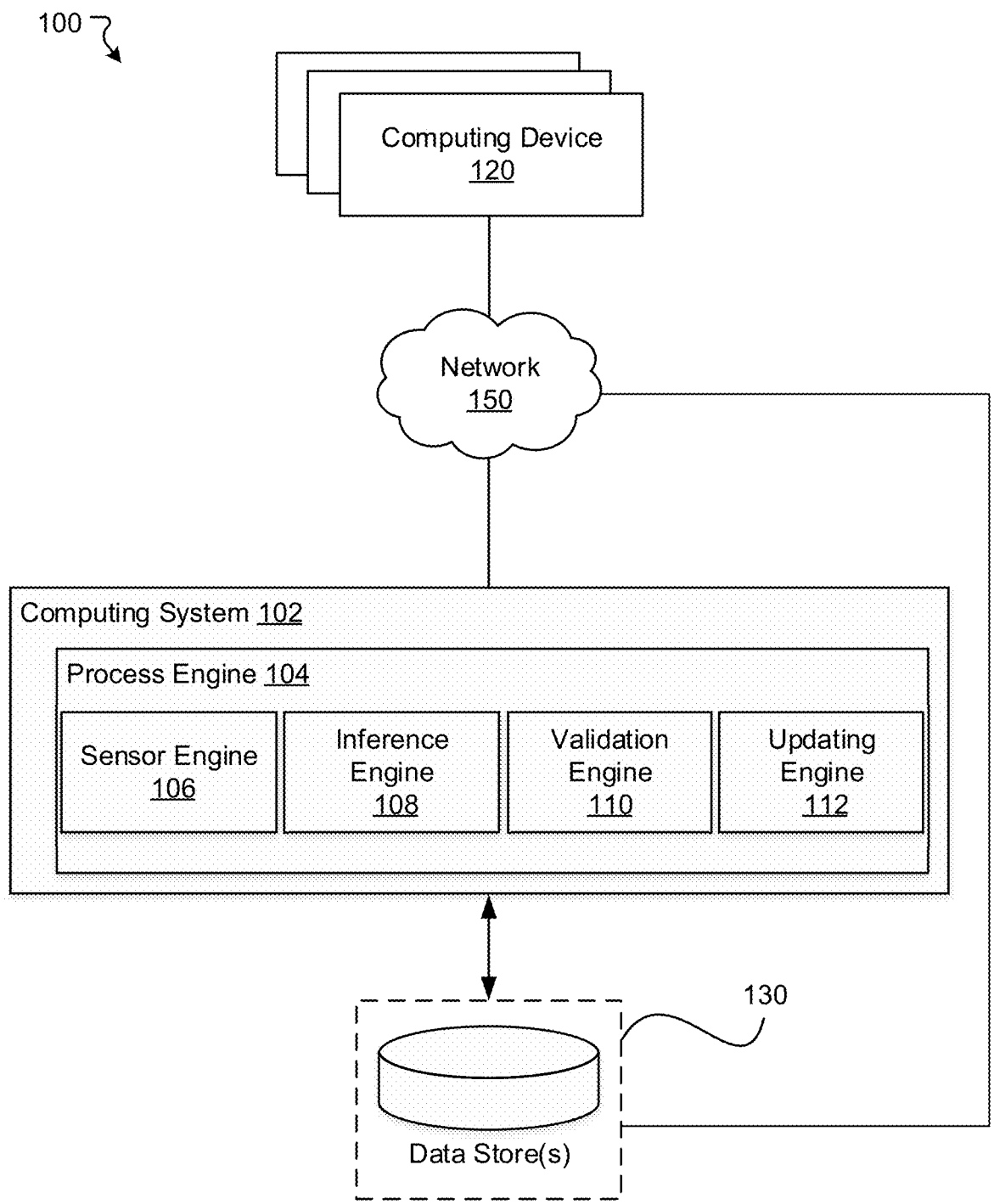
FIG. 1 depicts a diagram of an example of a system for inferring relationships between entities, in accordance with various embodiments.

A claimed solution rooted in computer technology overcomes problems specifically arising in the realm of computer technology. In various embodiments, a system may infer one or more relationships between entities. More specifically, the system may infer one or more relationships between entities of sensor data. For example, the sensor data may include image data (e.g., pictures, videos) that are associated with or represent the entities, and the entities may include vehicles and/or persons that are represented in the sensor data. In various embodiments, during continuous monitoring of the sensor data, the system may infer the one or more relationships of some or all the entities of the sensor data based on attributes of the entities. In some embodiments, the system may infer a hierarchical or geospatial relationship between the entities of the sensor data based on an absolute or relative location of the entities. The system may infer that a configuration, organization, or formation of the entities matches a prestored configuration, organization, or formation, for example, based on a distance or proximity between the entities.

In some embodiments, the system may further infer a role or identity of each of the entities, such as whether an entity is a person or a vehicle, and whether the entity has an adversarial relationship, a cooperative relationship, an associative relationship, an ownership relationship, and/or an associate relationship with one or more other entities. For example, the system may infer that one of the entities is a leader or a follower of one or more other entities. As another example, the system may infer that entities are part of an integrated unit and correlate or resolve the entities together. As another example, the system may infer that one entity is a person that owns another entity such as a vehicle.

In various embodiments, the system may validate or confirm inferred identities based on a characteristic or a location of the respective one or more entities. In some examples, the system may determine whether each of the inferred identities is compatible with a characteristic of a location of the one or more entities, such as a slope, a state of matter such as land or water, and a concentration of moisture of the location. For example, if the system infers that an entity is a land vehicle, the system may determine whether the location of the entity is, or comprises, land or a body of water. If the location of the entity is a body of water, the system may determine that the entity is not compatible with the body of water, and modify the inferred identity or move the location of the entity to a nearest location compatible with the entity, such as a nearest land-based location.

In various embodiments, the system may infer various potential relationships between entities and initially select a potential relationship having a highest probability of matching. In some examples, the potential relationship having the highest probability of matching may be obtained from a prestored model having a closest fit with inferred relationships between the entities. For example, a fit between a prestored model and the entities may be determined based on a degree of a compositional and/or a geopositional match between the entities and the model. As an example, the degree of the compositional match may be based on how many of the entities of the sensor data match or correspond to entities of a prestored model, and/or how many of the entities present in the prestored model match or correspond to the entities of the sensor data. For example, the sensor data may comprise five entities and a prestored model may comprise six entities, indicating that the degree of the compositional match is five out of six entities. As another example, the degree of the geopositional match may be based on how closely absolute locations, relative distances and/or relative positions between the entities of the sensor data match absolute locations, relative distances and/or relative positions between entities of a prestored model. For example, if a distance between entities of the sensor data is constant or nearly constant, the system may select a prestored model having constant or nearly constant distances between entities as the potential relationship having the highest probability of matching. As another example, if the entities of the sensor data are organized in several linear rows, the system may select a prestored model having a similar organization of entities as the potential relationship. As another example, an absolute location (e.g., a specific country or type of terrain) of the entities of the sensor data may be compared with an absolute location of entities in a prestored model to determine the potential relationship having the highest probability of matching.

The system may prompt a user to indicate whether the potential relationship having the highest probability of matching is valid. In response to the user indicating the potential relationship is valid, the system may confirm the potential relationship. In response to the user indicating that the potential relationship is invalid, the system may select another potential relationship having a second or next highest probability of matching, and may continue to select other potential relationships until the user indicates a valid potential relationship.

In various embodiments, the system may further detect a movement of the one or more entities based on the sensor data and/or inferences associated with the sensor data. In some examples, detecting movement may comprise determining a velocity, acceleration, and/or a trajectory or direction of the one or more entities. The system may further infer the one or more relationships based on the detected movement of the one or more entities. As an example, if the system detects that the one or more entities moves in a same direction and velocity, or within 45 degrees of one another, the system may infer that the one or more entities are part of an associated group and correlate or resolve the one or more entities together. In some embodiments, the system may further predict a future movement of the one or more entities based on attributes of the one or more entities, such as a relative and/or absolute location of the one or more entities. In some embodiments, the system may further determine a strategy to counteract or respond to the predicted future movement of the one or more entities.

In various embodiments, the system may further infer a location of another entity based on the inferred one or more relationships. For example, if the system infers that four vehicles are associated together as a group, the system may further infer that another vehicle or a person should also be associated with the group based on a template that includes an additional vehicle or person.

FIG. 1 illustrates an example environment 100, in accordance with various embodiments. The example environment 100 may include at least one computing system 102 that includes one or more processors and memory. The processors may be configured to perform various operations by interpreting machine-readable instructions. In some embodiments, the example environment 100 may be implemented as a data platform. In some embodiments, the example environment 100 may be configured to interact with computing systems of the data platform. In various embodiments, computing systems of the data platform may receive and process search queries to obtain sensor data.

In some embodiments, the computing system 102 may include a process engine 104. The process engine 104 may include a sensor engine 106, an inference engine 108, a validation engine 110, and an updating engine 112. The process engine 104 may be executed by the processor(s) of the computing system 102 to perform various operations including those operations described in reference to the sensor engine 106, the inference engine 108, the validation engine 110, and the updating engine 112. In general, the process engine 104 may be implemented, in whole or in part, as software that is capable of running on one or more computing devices or systems. In one example, the process engine 104 may be implemented as or within a software application running on one or more computing devices (e.g., user or client devices) and/or one or more servers (e.g., network servers or cloud servers). In some instances, various aspects of the inference engine 108, the validation engine 110, and the updating engine 112 may be implemented in one or more computing systems and/or devices. The environment 100 may also include one or more data stores 130 accessible to the computing system 102. The data stores 130 may be accessible to the computing system 102 either directly or over a network 150. In some embodiments, the data stores 130 may store data that may be accessed by the process engine 104 to provide the various features described herein. In some instances, the data stores 130 may include federated data stores, databases, or any other type of data source from which data may be stored and retrieved, for example. In some implementations, data stores 130 may include various types of data sets on which determinations of accuracy or consistency with other information can be made. In general, a user operating a computing device 120 can interact with the computing system 102 over the network 150, for example, through one or more graphical user interfaces and/or application programming interfaces.

The sensor engine 106 may be configured to obtain sensor data. The sensor engine 106 may continuously obtain the sensor data or obtain the sensor data at discrete time intervals. The sensor data may comprise pictorial or image data (e.g., pictures, videos), audio data, audiovisual data, atmospheric data (e.g., temperature, pressure, elevation, and/or the like) captured in either real-time or with a time delay, for example, from satellite maps or other sensors. For example, sensor data may comprise a set of images of one more entities. Accordingly, corresponding sensors may include cameras (e.g., satellite cameras, traffic cameras, and/or the like), audio devices (e.g., microphones), and/or the like. The sensor data may further comprise timestamp data indicating a time of capture of the sensor data. In some embodiments, the sensor engine 106, or a separate processing engine (not shown) may further process the obtained sensor data to infer additional data, such as attributes of entities captured by the sensor data. For example, the attributes of the entities may comprise a size of the entities, a movement velocity, direction, or acceleration, and absolute location coordinates or relative location with respect to other entities. Each of the entities may have an identification number. The sensor engine 106 may selectively display only specific entities having a certain criteria while not displaying other entities not fitting the criteria. For example, the sensor engine 106 may only display entities moving at a certain velocity.

The inference engine 108 may be configured to input the obtained sensor data from the sensor engine 106 and infer one or more relationships between the entities. The inference engine 108 may infer the one or more geospatial or hierarchical relationships of some or all the entities of the sensor data based on attributes of the entities, such as a size or relative or absolute locations of the entities, and/or a frequency or range of frequencies emitted by the entities for example, based on existing models including prestored configurations, organizations, formations, or templates. Each of the existing models may comprise information of an associated or correlated group of entities, including a role or identity of each entity. For example, the role of an entity may be a leader or follower, and the identity of the entity may indicate a type of entity such as a vehicle. As an example, the inference engine 108 may compare relative distances and positions between one or more entities of the sensor data and determine whether the relative distances and positions are within a threshold range of relative distances and positions of an existing model. In response to the relative distances and positions being within the threshold range, the inference engine 108 may infer the one or more entities are associated with one another in a same manner as in the existing model, and infer identities of the respective one or more entities. As another example, if the entities all emit frequencies of a certain range, the inference engine 108 may resolve the entities as an integrated unit In some embodiments, the inference engine 108 may infer based on an existing model having a probability, confidence interval, or best fit with the one or more entities. In some embodiments, the inference engine 108 may infer that one or more additional entities are associated with the one or more entities based on an existing model. More details describing the inference engine 108 will be provided below in reference to FIG. 2 and FIGS. 3A-3D.

The inference engine 108 may provide results of one or more inferred relationships to the validation engine 110, which confirms or validates the one or more inferred relationships, for example, based on a characteristic of a location of the respective one or more entities. As an example, the validation engine 110 may determine whether the inferred identities of the respective one or more entities is compatible with a slope, a state of matter, or a concentration of moisture of the location. For example, if an entity inferred to be a type of vehicle cannot operate on land having a slope higher than a threshold (such as 15% slope), and the location of the vehicle has a slope higher than 15%, the entity is determined to be incompatible with the location. In response to an entity determined to be incompatible with the location, the validation engine 110 may provide feedback to the inference engine 108. The inference engine 108 may either modify the inferred relationship to another relationship in which an inferred identity of the entity is compatible with the location, modify an inferred identity of the entity to be compatible with the location, while maintaining a same inferred relationship, or move the entity to a nearest compatible location. For example, if the entity determined to be incompatible with the location is an additional entity inferred by the inference engine 108, the inference engine 108 may move the additional entity to a nearest compatible location. As another example, if the entity determined to be incompatible with the location is not an additional entity, and was originally inferred as part of an associated or correlated group, the inference engine 108 may modify the inferred identity of the entity to be compatible with the location (for example, inferring the entity to be a type of vehicle that is operable on land having a same slope as that of the location).

The validation engine 110 may further request validation of the inferred relationships from a user. If the user does not validate a relationship, the validation engine 110 may provide feedback to the inference engine 108. The inference engine 108 may select another inference based on another existing model having a next highest confidence interval, probability, or best fit, until the user validates the relationship. In some embodiments, the validation engine 110 may allow the user to partially validate the inferred relationship while modifying the inferred relationship. The validation engine 110 may provide feedback to the inference engine 108 regarding the modification. The inference engine 108 may store the modified relationship as a new model or modify the existing model to conform to the modified relationship.

The updating engine 112 may be configured to update the sensor data based on the validated inferences from the validation engine 110. For example, the updating engine 112 may be configured to pictorially update a display indicating the inferred relationships and identities of the entities.

Figure 2:
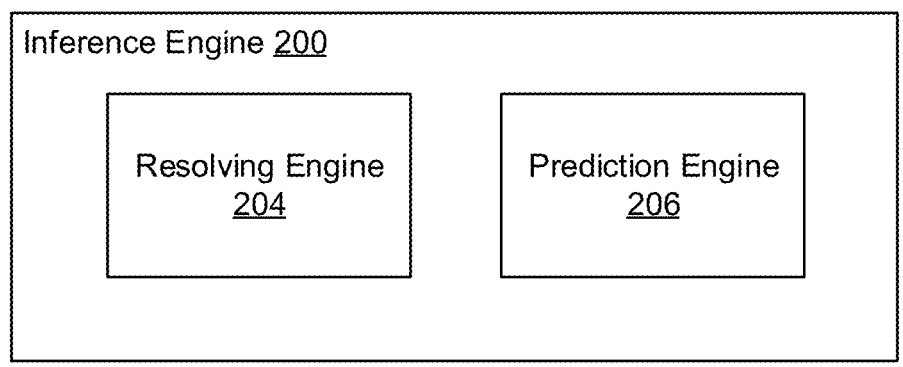
FIG. 2 depicts a diagram of an inference engine, in accordance with various embodiments.

FIG. 2 illustrates an example inference engine 200, in accordance with various embodiments. In some embodiments, the inference engine 200 may be implemented as inference engine 108 in FIG. 1. The inference engine 200 may include a resolving engine 204 and a prediction engine

206. The resolving engine 204 may infer one or more geospatial and/or hierarchical relationships between one or more entities, for example, based on attributes of the one or more entities such as relative or absolute locations or movements (directions, velocities, accelerations) of the one or more entities. For example, the resolving engine 204 may resolve one or more entities as an integrated group or unit based on an existing model. The prediction engine 206 may predict or infer additional entities not previously resolved by the resolving engine 204 to also be included in the integrated group or unit. The prediction engine 206 may further predict future movements, for example, a direction, velocity, or acceleration, of the one or more entities based on the inferred relationships, including the additional entities predicted by the prediction engine 206.

Figure 3A:
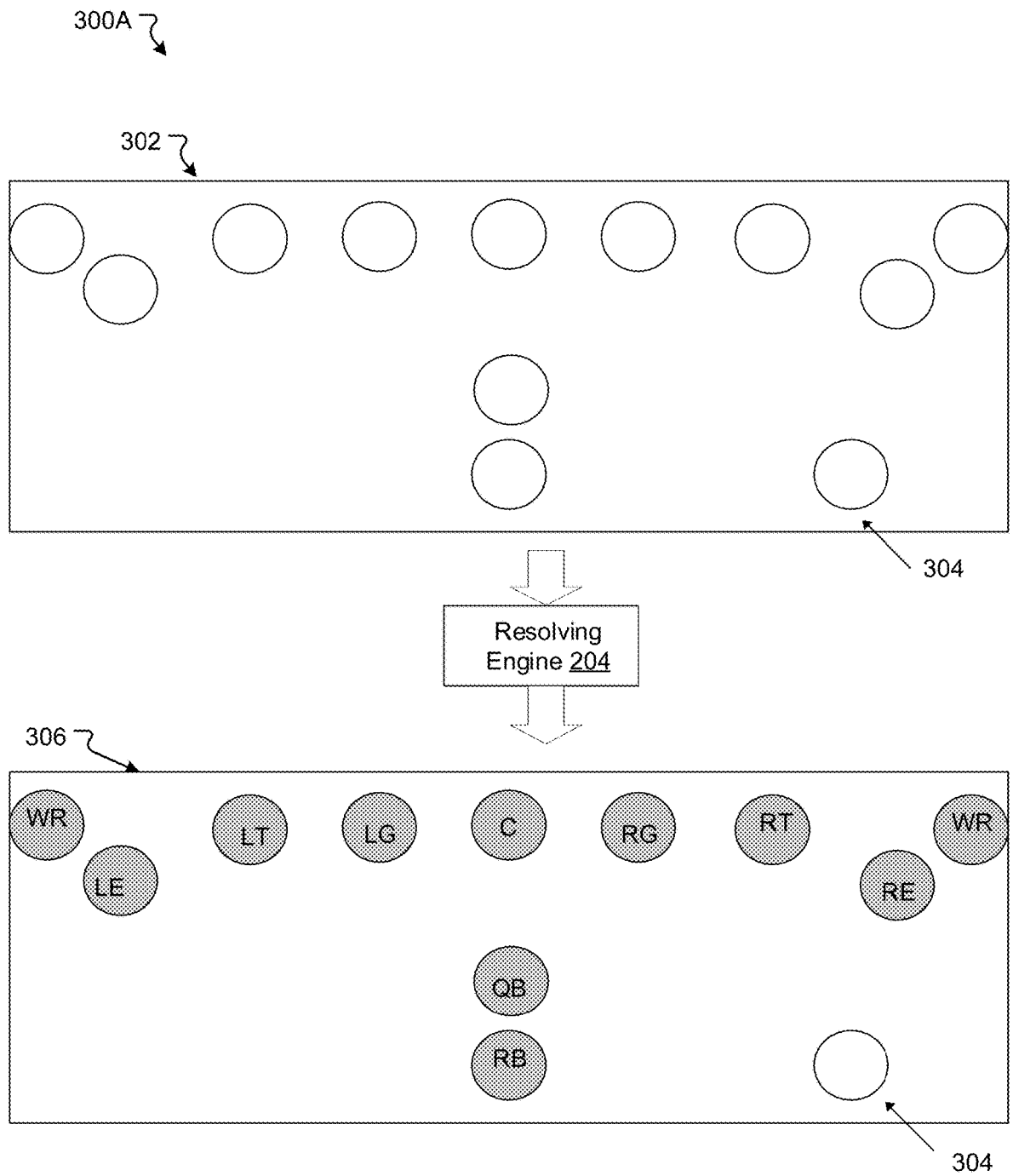
FIGS. 3A-3D depict example interfaces showing outputs of an inference engine, in accordance with various embodiments.

FIG. 3A depicts an example of an operation of the resolving engine 204. For example, the resolving engine 204 may take in sensor data 302. The resolving engine 204 may determine that the sensor data 302 comprises a formation similar to a football formation stored in an existing model, and that the similarity exceeds a predetermined threshold or confidence interval. The resolving engine 204 may compare a location of the entities of the sensor data 302 and a relative distance between the entities to existing models. For example, the resolving engine 204 may determine that the entities are all on a football field and search for existing models with a location on or similar to a football field. The resolving engine may further determine that entity 304 is not part of an existing model. For example, entity 304 may be a referee not part of the formation. The resolving engine 204 may resolve the sensor data 302, other than entity 304, as an integrated unit in a resolved dataset 306. The resolving engine 204 may further identify roles of the resolved entities, in this case, the positions of the football players.

Figure 3B:
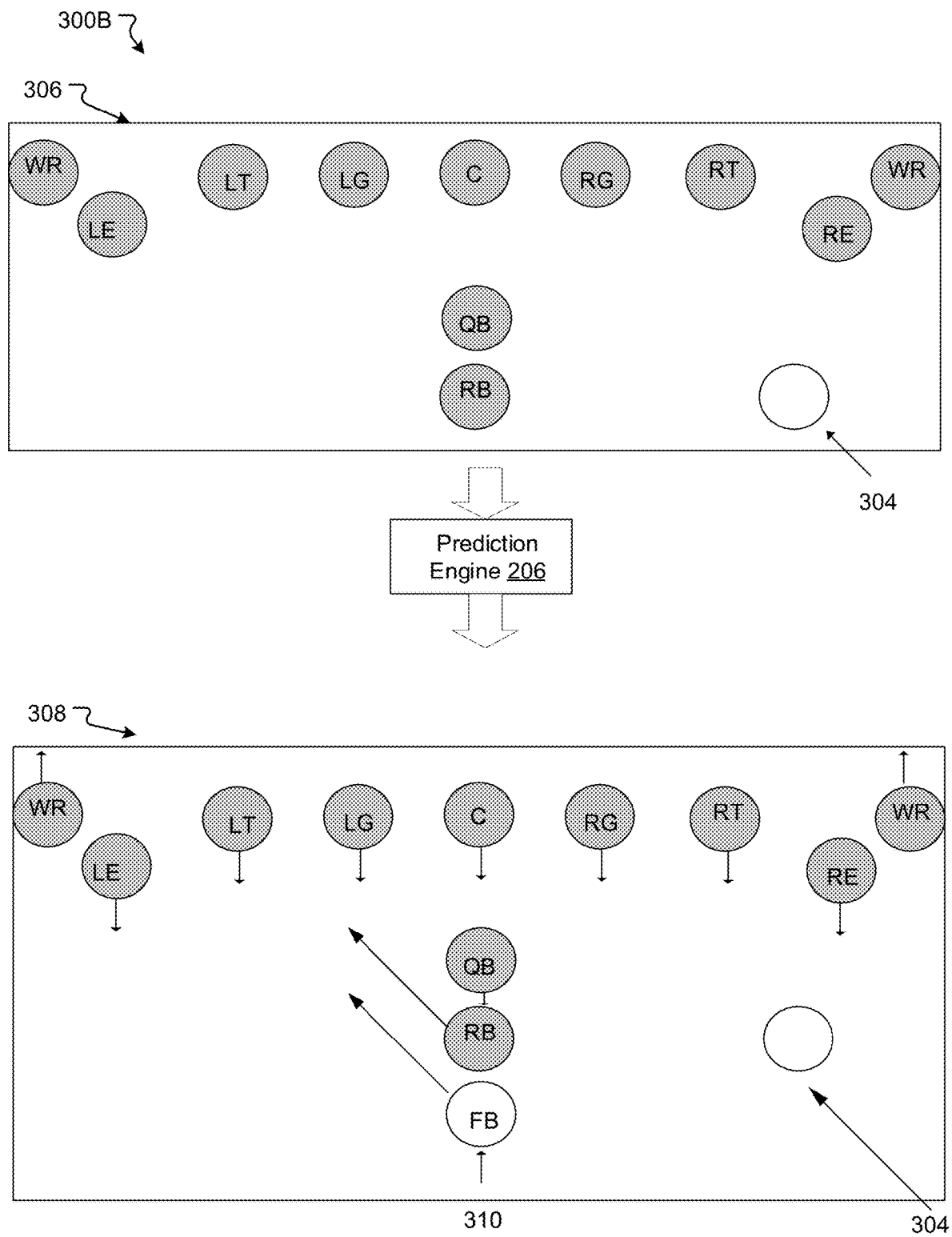

FIG. 3B depicts an example of an operation of the prediction engine 206. For example, the prediction engine 206 may, from the resolved dataset 306, further predict a direction of movement of the identified football players of the resolved dataset 306, as indicated by arrows, in prediction dataset 308. The prediction engine 206 may further predict a velocity or acceleration of movement by the identified football players in the resolved dataset 306. The prediction engine 206 may further predict or infer that another entity should also be part of the integrated unit. For example, the prediction engine 206 may further predict that an entity 310, labelled as "FB," or "fullback," should also be part of the formation.

Figure 3C:
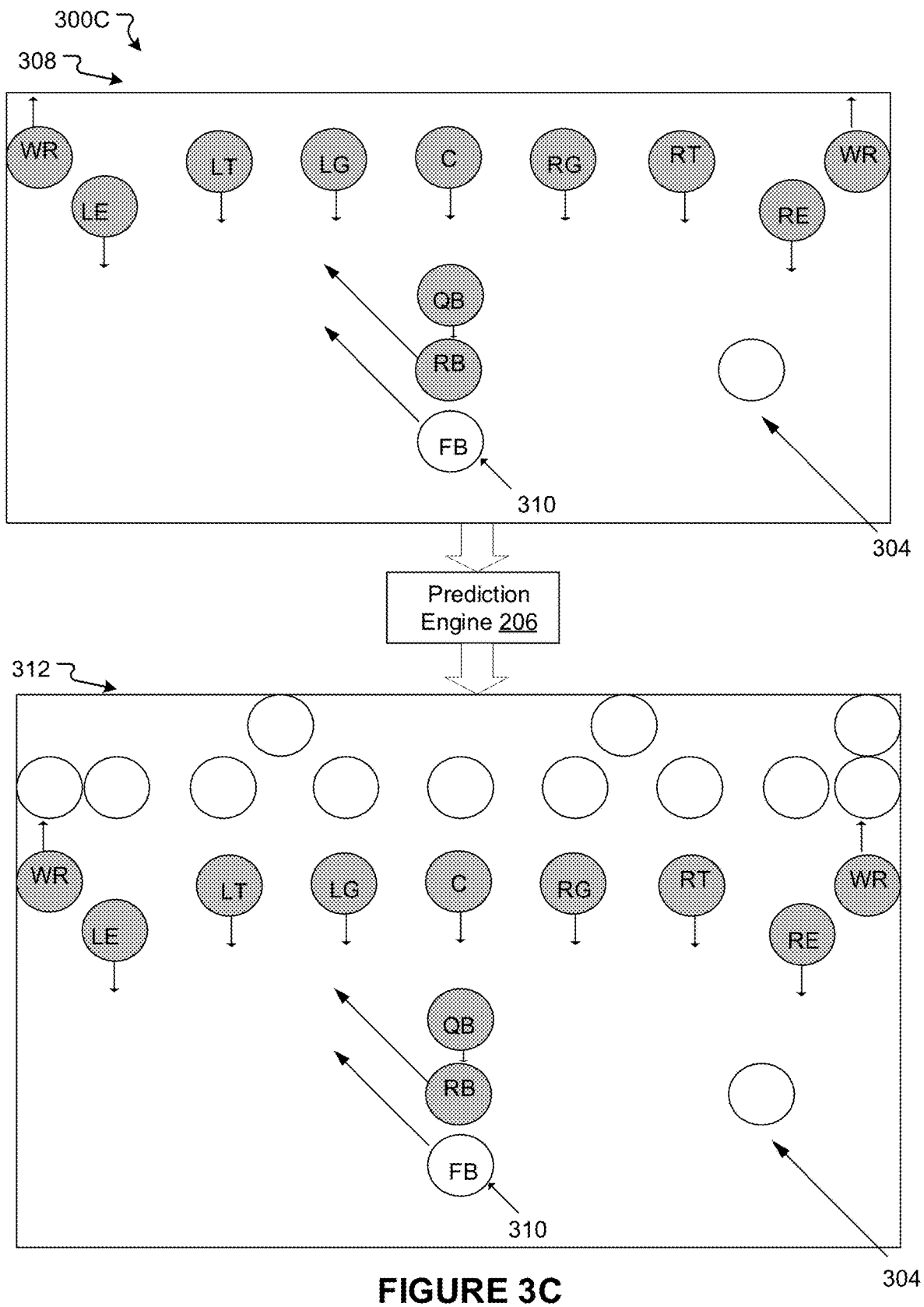

FIG. 3C depicts an example of an operation of the prediction engine 206. For example, the prediction engine 206 may, from the prediction dataset 308, further propose a strategic formation in a second prediction dataset 312 to counteract a formation in prediction dataset 308. The prediction engine 206 may propose the strategic formation based on an existing model, or based on previous historical data of formations used, for example, in formations similar to the resolved dataset 306 or the prediction dataset 308.

The resolved dataset 308, prediction dataset 310, and second prediction dataset 312 may further be validated, by the validation engine 210, based on a characteristic of a location of the one or more entities (e.g., a condition of a football field on which the football players are on). As an example, if an amount of moisture on the football field is above a threshold, certain football players may not be on the field. For example, if the amount of moisture on the football field is above the threshold, at most 1 "WR" may be on the football field. The prediction engine 206 may then select another formation in which identities (e.g., positions) of the football players are compatible with the condition of the football field, or change an identity of one of the "WRs" to another position without selecting another formation. If the prediction engine 206 changes the identity of one of the "WRs," the prediction engine 206 may store the new identity of one of the "WRs" as part of a modified relationship in a new model or modify the existing model to conform to the modified relationship.

Figure 3D:
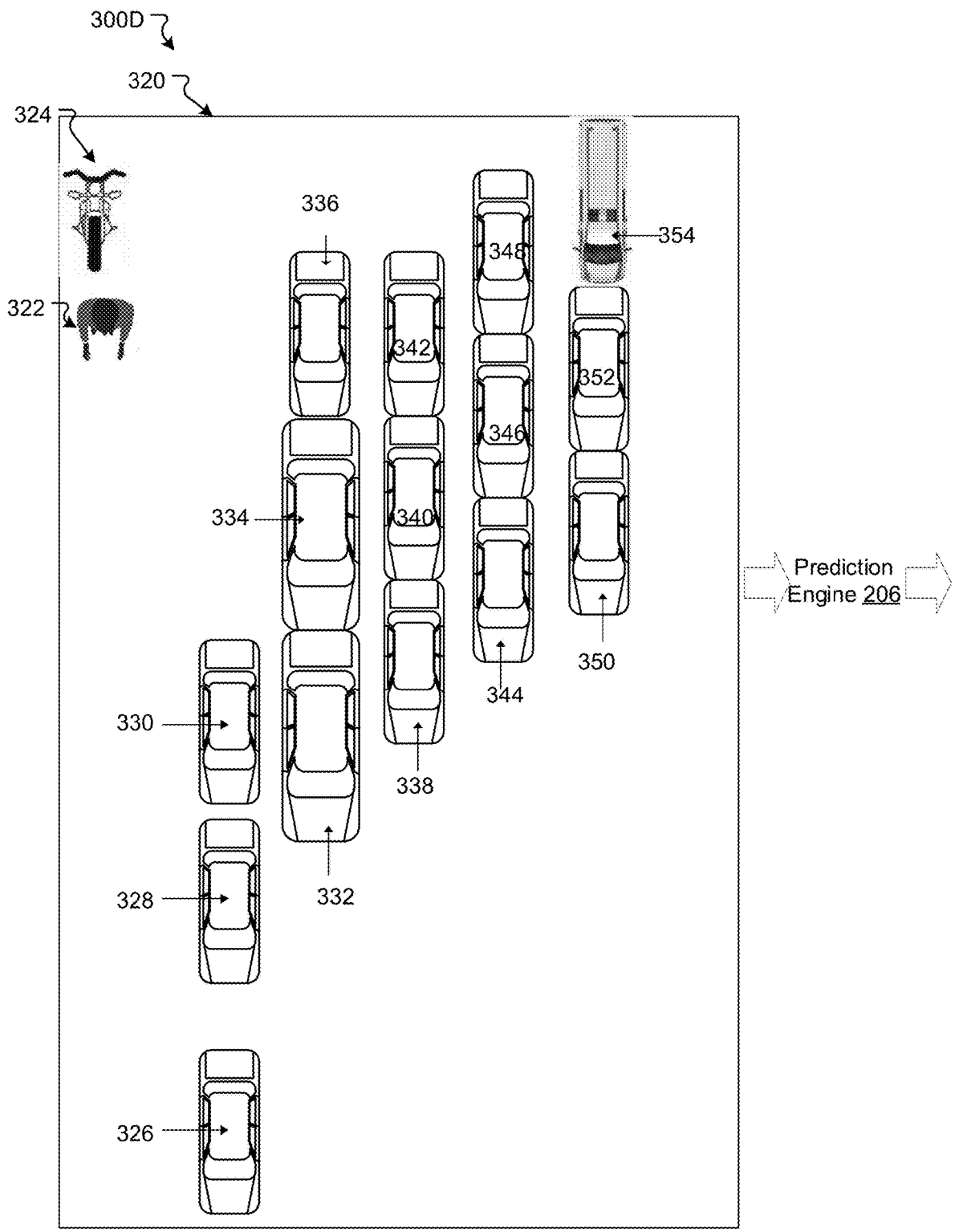
Figure 3D:
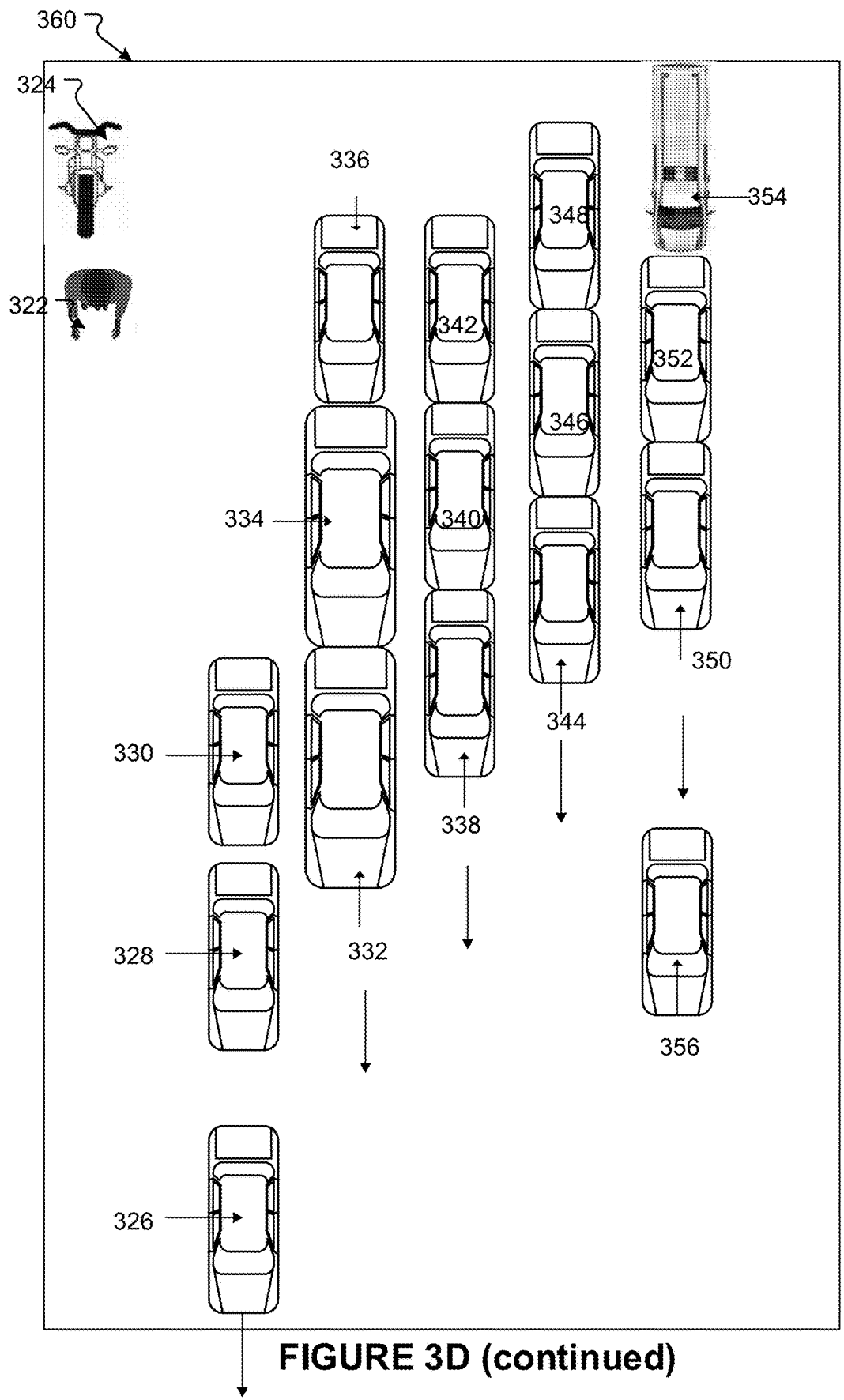

FIG. 3D depicts an example of an operation of the prediction engine 206 after sensor data 320 has been processed by the resolving engine 204. During processing of the sensor data 320, the resolving engine 204 may determine that the sensor data 320 comprises a formation similar to a motorcade stored in an existing model, and that the similarity exceeds a predetermined threshold or confidence interval. The resolving engine 204 may compare a location of the entities 322-354 of the sensor data 320, a relative distance between the entities 322-354, and a direction, velocity, or acceleration of movement of the entities 322-354 to existing models. For example, the resolving engine 204 may determine that the entities are all on a road near a government building and search for existing models at locations near a government building. The resolving engine 204 may further determine that entities 322 (a person) and 324 (a motorcycle) are not part of an existing model. The resolving engine 204 may resolve entities 326-354, without including entities 322 and 324, as part of a resolved dataset. The resolving engine 204 may further identify roles of the resolved entities. Specifically, the resolving engine 204 may identify 326 as a route, 328 as a pilot, 330 as a lead, 332 as a spare, 334 as a stagecoach, 336 as a halfback, 338 as an electronic-countermeasures vehicle, 340 as a control, 342 as a support, 344 as a cat, 346 as an ID car, 348 as a hazardous materials-mitigation vehicle, 350 as a press van, 352 as a roadrunner, and 354 as an ambulance.

The prediction engine 206 may generate, from the resolved dataset generated by the resolving engine 204, a prediction dataset 360. The prediction engine 206 may predict a direction, velocity, or acceleration of movement of the identified entities 326-354, as indicated by arrows of the prediction dataset 360. For example, the prediction engine 206 may predict that the identified entities 326-354 all travel in a same direction at a constant velocity until the identified entities 326-354 reach a destination. The prediction engine 206 may further predict or infer that another entity should also be part of the motorcade. For example, the prediction engine 206 may further predict that an entity 356, a press van, should also be part of the motorcade.

The sensor data 320 and the prediction dataset 360 may further be validated, by the validation engine 210, based on a characteristic of a location of the one or more entities (e.g., a road on which the motorcade is travelling). As an example, if a slope of the road is above a threshold, the location may not be compatible with one or more of the identified entities 326-354 because one or more of the identified entities 326-354 may not be able to operate on such roads. For example, if the slope of the road is above a threshold, the entity 354 may not be compatible with the road. The prediction engine 206 may then select another formation in which identities of the entities 326-354 are compatible with the condition of the road, or change an identity of the entity 354 to another type of vehicle that is compatible with the road without selecting another formation. If the prediction engine 206 changes the identity of the entity 354, the prediction engine 206 may store the new identity of the entity 354 as part of a modified relationship in a new model or modify the existing model to conform to the modified relationship.

As another illustrative example of an operation of the prediction engine 206, the prediction engine 206 may infer or predict current or future migration patterns of wildlife, for example, based on historical data or models of previous migration patterns of wildlife. The prediction engine 206 may predict migration patterns of wildlife based on quantity, geospatial locations of other wildlife, and/or a relationship information between the wildlife and the other wildlife. For example, the relationship information may include, a predator-prey relationship, if applicable, a category which the wildlife fall under, such as invertebrates, mammals, birds, amphibians, reptiles and fish, and a classification information of the wildlife such as kingdom, phylum, class, order, family, genus, and species. Moreover, the inferred or predicted migration patterns may include, for example, inferred or predicted geospatial locations of a specific wildlife at a specific time, and direction, velocity, or acceleration of movements of specific wildlife over time. For example, the prediction engine 206 may predict a specific location of a fish at different times. The specific location of the fish may be based on a location and quantity of other fish of a same or different species, locations and quantities of potential predators such as bears, and locations and quantities of potential prey such as insects. The system may utilize historical data of relative geospatial orientations of the fish and other organisms to predict a specific location of the fish. Once the prediction engine 206 predicts a specific location of the fish, the prediction engine 206 may further validated the predicted location, for example, based on a terrain of the location. As an example, if the predicted location of the fish is on land, the system may determine that the predicted location is not compatible with the fish. The prediction engine 206 may then move the fish to a nearest compatible location, such as a nearest body of water. The prediction engine 206 may then perform second order modifications such as predicting an updated location of other wildlife based on moving the fish to the nearest compatible location.

Example Flowcharts of Process

Figure 4:
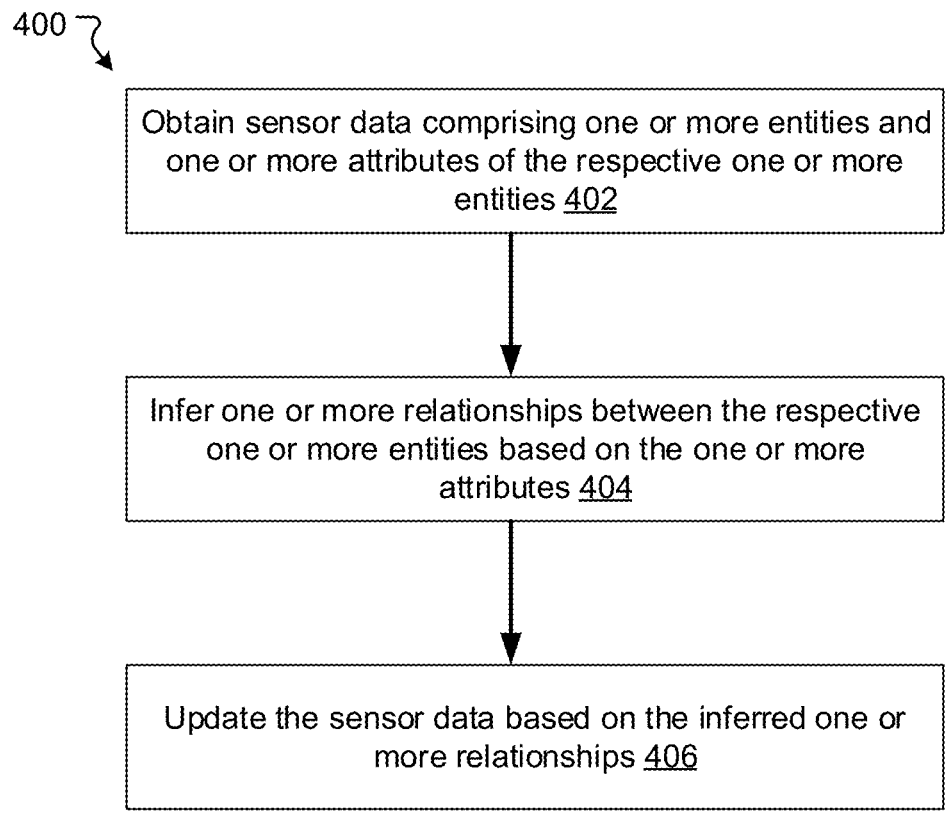
FIG. 4 depicts a flowchart of an example method for inferring relationships between entities, in accordance with various embodiments.

FIG. 4 depicts a flowchart of an example method 400 for inferring relationships, in accordance with various embodiments. The operations of method 400 presented below are intended to be illustrative and, as such, should not be viewed as limiting. In some implementations, method 400 may be accomplished with one or more additional operations not described, and/or without one or more of the operations discussed. In some implementations, two or more of the operations may occur substantially simultaneously. The described operations may be accomplished using some or all of the system components described herein.

In an operation 402, method 400 may include obtaining sensor data comprising one or more entities and one or more attributes of the respective one or more entities. In an operation 404, method 400 may include inferring one or more relationships between the respective one or more entities based on the one or more attributes. In an operation 406, method 400 may include updating the sensor data based on the inferred one or more relationships.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
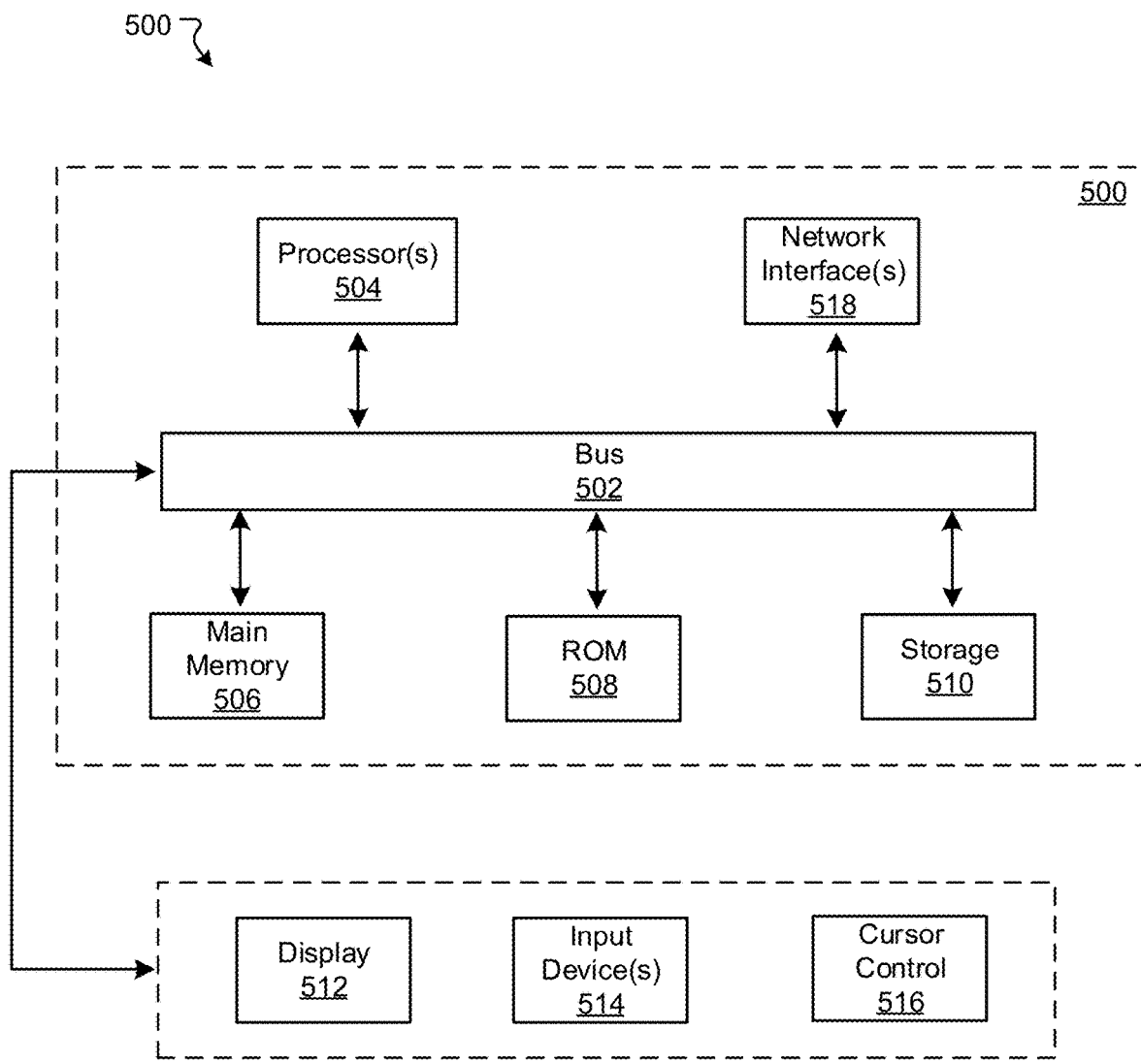
FIG. 5 depicts a block diagram of an example computer system in which any of the embodiments described herein may be implemented.

FIG. 5 depicts a block diagram of an example computer system 500 in which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C, or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media may also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer may load the instructions into its dynamic memory and send the instructions over a telephone line using a modem. A modem local to computer system 500 may receive the data on the telephone line and use an infra-red transmitter to convert the data to an infra-red signal. An infra-red detector may receive the data carried in the infra-red signal and appropriate circuitry may place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 may send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention may be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines may provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment may be combined with one or more features of any other embodiment.

Other implementations, uses and advantages of the invention will be apparent to those skilled in the art from consideration of the specification and practice of the invention disclosed herein. The specification should be considered to describe examples only, and the scope of the invention is accordingly intended to be limited only by the following claims.

What is claimed is:

1. A system comprising:
one or more processors; and
memory storing instructions that, when executed by the one or more processors, cause the system to perform:
obtaining sensor data comprising first entities and attributes of the respective first entities, wherein the attributes comprise a detected movement property of the first entities;
inferring, from the sensor data, one or more relationships between the respective first entities and that the first entities are comprised within a common group and associated with a formation based on the attributes, wherein the inferring is based on:
a number of the first entities that match a configuration of second entities, or a subset of the second entities, wherein the second entities altogether are associated together as a group within a model, wherein the model indicates a previous formation, respective types of the second entities, and inferred relationships among the second entities within the previous formation; and
a ratio of the number of the first entities to a number of the second entities;
receiving a modification to an inferred relationship in the model or predicting a change in a type of an entity in the model;
updating the model based on the modification received to the inferred relationship or the predicted change in the type of the entity;
inferring that an additional entity that was not previously included within the first entities is also associated with the formation based on a movement property of the additional entity;
generating a dataset representing third entities based on the formation and predicted future velocities or predicted future accelerations of the first entities and the additional entity; and
coordinating an action to respond to the formation based on the generated dataset.

2. The system of claim 1, wherein the one or more attributes comprise locations or times of the first entities.

3. The system of claim 1, wherein the inferring the one or more relationships comprises inferring one or both of a hierarchical relationship and a geospatial relationship between the first entities.

4. The system of claim 1, wherein inferring the one or more relationships comprises inferring one or more identities of the first entities, and wherein, the instructions further cause the system to perform:
validating the one or more inferred identities based on a characteristic of a location of the first entities.

5. The system of claim 4, wherein:
the validating the one or more inferred identities comprises determining whether the first entities are compatible with the characteristic of the location; and
wherein, the instructions further cause the system to perform:
in response to determining that the first entities are not compatible with the characteristic of the location, modifying the one or more inferred identities to be compatible with the characteristic of the location or moving the first entities to a nearest location having a compatible characteristic.

6. The system of claim 4, wherein the characteristic comprises at least one of a slope, a state of matter, and a concentration of moisture of the location.

7. The system of claim 3, wherein:
the inferring the one or more relationships comprises inferring the hierarchical relationship and the geospatial relationship between the first entities; and
the hierarchical relationship comprises one of an adversarial relationship between the first entities, a cooperative relationship between the first entities, an associative relationship between the first entities, and an ownership relationship between the first entities.

8. The system of claim 1, wherein the instructions further cause the system to perform:
inferring a location of another entity based on the inferred one or more relationships.

9. A method implemented by a computing system including one or more processors and storage media storing machine-readable instructions, wherein the method is performed using the one or more processors, the method comprising:
obtaining sensor data comprising first entities and attributes of the respective first entities, wherein the attributes comprise a detected movement property of the first entities;
inferring, from the sensor data, one or more relationships between the respective first entities and that the first entities are comprised within a common group and associated with a formation based on the attributes, wherein the inferring is based on:
a number of the first entities that match a configuration of second entities, or a subset of the second entities, wherein the second entities altogether are associated together as a group within a model, wherein the model indicates a previous formation, respective types of the second entities, and inferred relationships among the second entities within the previous formation; and a ratio of the number of the first entities to a number of the second entities;

receiving a modification to an inferred relationship in the model or predicting a change in a type of an entity in the model;

updating the model based on the modification received to the inferred relationship or the predicted change in the type of the entity;

inferring that an additional entity that was not previously included within the first entities is also associated with the formation based on a movement property of the additional entity;

generating a dataset representing third entities based on the formation and predicted future velocities or predicted future accelerations of the first entities and the additional entity; and coordinating an action to respond to the formation based on the generated dataset.

10. The method of claim 9, wherein the one or more attributes comprise locations or times of the first entities.

11. The method of claim 9, wherein the inferring the one or more relationships comprises inferring one or both of a hierarchical relationship and a geospatial relationship between the first entities.

12. The method of claim 9, wherein the inferring the one or more relationships comprises inferring one or more identities of the first entities, and further comprising:

validating the one or more inferred identities based on a characteristic of a location of the first entities.

13. The method of claim 12, wherein the validating the one or more inferred identities comprises determining whether the first entities are compatible with the characteristic of the location; and further comprising:

in response to determining that the entities are not compatible with the characteristic of the location, modifying the one or more inferred identities to be compatible with the characteristic of the location or moving the entities to a nearest location having a compatible characteristic.

14. The method of claim 12, wherein the characteristic comprises at least one of a slope, a state of matter, and a concentration of moisture of the location.

15. The method of claim 11, wherein:

the inferring the one or more relationships comprises inferring the hierarchical relationship and the geospatial relationship between the entities; and the hierarchical relationship comprises one of an adversarial relationship between the entities, a cooperative relationship between the entities, an associative relationship between the entities, and an ownership relationship between the entities.

16. The system of claim 1, wherein the characteristic of the location comprises a terrain.

17. The system of claim 1, wherein the predicting of the future velocity or the future acceleration is based on:

previous movement patterns of the common types of entities, geospatial locations and orientations of other entities, quantities of other entities, categories or classifications of the other entities, and a historical movement model of the common types of entities, and the instructions further cause the system to perform:

predicting updated locations of the other entities based on the predicted velocities or the predicted accelerations.

18. The system of claim 17, wherein the validating is based on a terrain, and the instructions further cause the system to perform:

in response to an entity of the one or more first entities being invalidated, updating an identity of the entity and revising the historical movement model based on the updated identity of the entity.

19. The system of claim 1, wherein the inferring that the one or more first entities are comprised within a common group is based on a common range of frequencies emitted by the one or more entities.

* * * * *